United States Patent [19]
Weman et al.

[11] 3,948,461
[45] Apr. 6, 1976

[54] TIPPING VEHICLE SENSITIVE RETRACTOR

[75] Inventors: Per Olaf Weman, Haslah; Harald Martin Schmelow, Ellerau, Krs. Segeberg, both of Germany

[73] Assignee: Allied Chemical Corporation, New York, N.Y.

[22] Filed: Nov. 25, 1974

[21] Appl. No.: 526,653

[52] U.S. Cl. .................................. 242/107.4 B
[51] Int. Cl.² ............................. B65H 75/48
[58] Field of Search ..242/107.4–107.7; 280/150 SB; 297/386–387; 74/578

[56] References Cited
UNITED STATES PATENTS
3,823,893   7/1974   Svensson ................... 242/107.4

*Primary Examiner*—Leonard D. Christian
*Attorney, Agent, or Firm*—John P. Kirby; Ernest D. Buff

[57] ABSTRACT

A vehicle sensitive safety belt retractor is provided with actuating means responsive to acceleration of the vehicle for directly engaging with ratchet means mounted for interaction with a belt strap reel of the retractor, and thereby preventing protraction of the belt. The actuating means includes a unitary tipping inertia and locking member which is tippable from its position of rest so as to engage the ratchet means. The center of gravity of the unitary member passes over its pivot point on tipping of the member into locked position, so that it can only be returned to its stable, non-tipped position on movement of the ratchet means which it has engaged in a belt retraction direction. In one embodiment, a plurality of such unitary members are used in association with the single ratchet.

4 Claims, 2 Drawing Figures

TIPPING VEHICLE SENSITIVE RETRACTOR

BACKGROUND OF THE INVENTION

1. Field of the Invention

This invention relates to seat belt retractors for passengers in vehicles such as automobiles, and more particularly to an inertia responsive safety belt retractor which is vehicle sensitive, that is to say, one responsive to acceleration of the vehicle, for preventing protraction of the belt upon predetermined acceleration of the vehicle.

2. Description of the Prior Art

Vehicle sensitive safety belt retractors have been recently developed which should significantly decrease the number of fatalities and serious injuries resulting from motor vehicle accidents. Most of these retractors include a belt reel which is continually biased in a retracting direction, a pawl which is engageable with ratchet teeth on the end or associated with the belt reel, and an actuating mechanism having a pendulum in contact with the pawl and freely suspended from a ball and socket type mount. When the pendulum is displaced from its normally vertical position by an acceleration of the vehicle, it moves the pawl into engagement with the ratchet teeth, preventing further protraction of the belt. It is obviously of prime importance that the force necessary for proper displacement of the pendulum from the vertical position be correctly established and maintained at the magnitude necessary for proper actuation of the pawl. This requirement has, however, been difficult to meet. Particles of dirt and corroded material entrapped between the ball and the socket, as well as the sliding friction generated therebetween, can alter the acceleration required to displace the pendulum by a magnitude as high as one hundred percent or more. Unless regularly serviced, the actuating mechanism of the retractor may become insufficiently reliable in operation when subjected to changing climatic conditions for prolonged periods of time. For the above reasons, retractors of the type generally described result in lower reliability factors and higher maintenance costs than are considered to be commercially acceptable.

Retractors have also been designed in which an inverted pendulum moves between two stable positions on the occurrence of acceleration force sufficient to lock the retractor and on cessation of those acceleration forces. Such a retractor is shown, for example, in U.S. Pat. No. 3,758,044. Such structure of the prior art suffers, among other deficiencies, from a complexity of operating structure and from the transience of the locking ability (the automatic) return of the inverted pendulum to the unlocked position on cessation of the acceleration force).

SUMMARY OF THE INVENTION

The present invention provides an inertia responsive and vehicle sensitive seat belt retractor having an actuating means which is highly reliable in operation and inexpensive to maintain. In one embodiment, the retractor in which the actuating means is incorporated comprises a support means, reel means rotatably mounted on the support means, belt means attached to the reel means for protraction and retraction with respect thereto, biasing means for urging the reel means in a retracting direction, ratchet means mounted on the reel means for rotation therewith and a unitary inertia and locking member mounted on the support means for engaging the ratchet means to stop rotation of the reel means, thereby preventing further protraction of the belt means. The unitary tippable inertia and locking member is incorporated in the retractor and is responsive to acceleration of the vehicle. Preferably, more than one unitary member is employed with the ratchet in order to provide for response to acceleration forces from different directions.

During normal operation of the vehicle, the unitary tippable inertia and locking member or members remain in a substantially vertical position. The member does not engage the ratchet means and the belt means can be protracted and retracted to suit the convenience of the occupant. Acceleration of the vehicle which is greater than a preselected magnitude causes the tippable inertia member to tip from its substantially vertical position and engage the ratchet means to lock it, thereby preventing further protraction of the belt means.

Advantageously, the unitary tippable inertia and locking member may be used in association with a retractor which includes webbing sensitive means for locking the retractor on rapid acceleration of the seat belt when it is protracting, as in U.S. Pat. No. 3,741,496, for example.

The apparatus of this invention has advantageous structural features. The unique tipping of the unitary inertia and locking member provides for simple and effective locking action, and eliminates sliding friction, as well as the entrapment of dirt particles and corroded material therebetween. Thus, the acceleration required for proper actuation of the unitary member can be sustained at the preselected magnitude without periodic maintenance for a prolonged period of time. Moreover, the necessity to move the center of inertia of the unitary member past the pivot point to tip it into locking position provides a detent action which provides filtering out of movement of the tipping member due to accelerations of the vehicle below the preselected magnitude, such as those generated by road noise and the like. The tipping member remains in the substantially vertical position and is not set in motion until its actuating movement is required. Furthermore, since the tipping member locks directly on the ratchet and not through intervening structure, the mounting is less subject to wear, variations in locking conditions, or complications, and further, since the tipping member is also the locking member (it is unitary) it can lock directly without complicating intermediary structure on the retractor ratchet connected to the reel whether or not the reel is otherwise locked responsive to webbing protraction at an accelerated rate.

In the description of this patent application, the ratchet may be directly connected to the reel for movement therewith as shown in the drawings, or may be on a clutch or other intervening structure which acts on the reel to lock it.

BRIEF DESCRIPTION OF THE DRAWING

The invention will be more fully understood and further advantages will become apparent when reference is made to the following detailed description and the accompanying two FIGS. of drawing, which are longitudinal sections through one form of a vehicle sensitive safety belt retractor incorporating the present invention with a cutaway section showing a portion of the biasing means FIG. 1 shows the retractor with one unitary tippable inertia and locking member, while

DETAILED DESCRIPTION OF THE DRAWING

Figure 1:
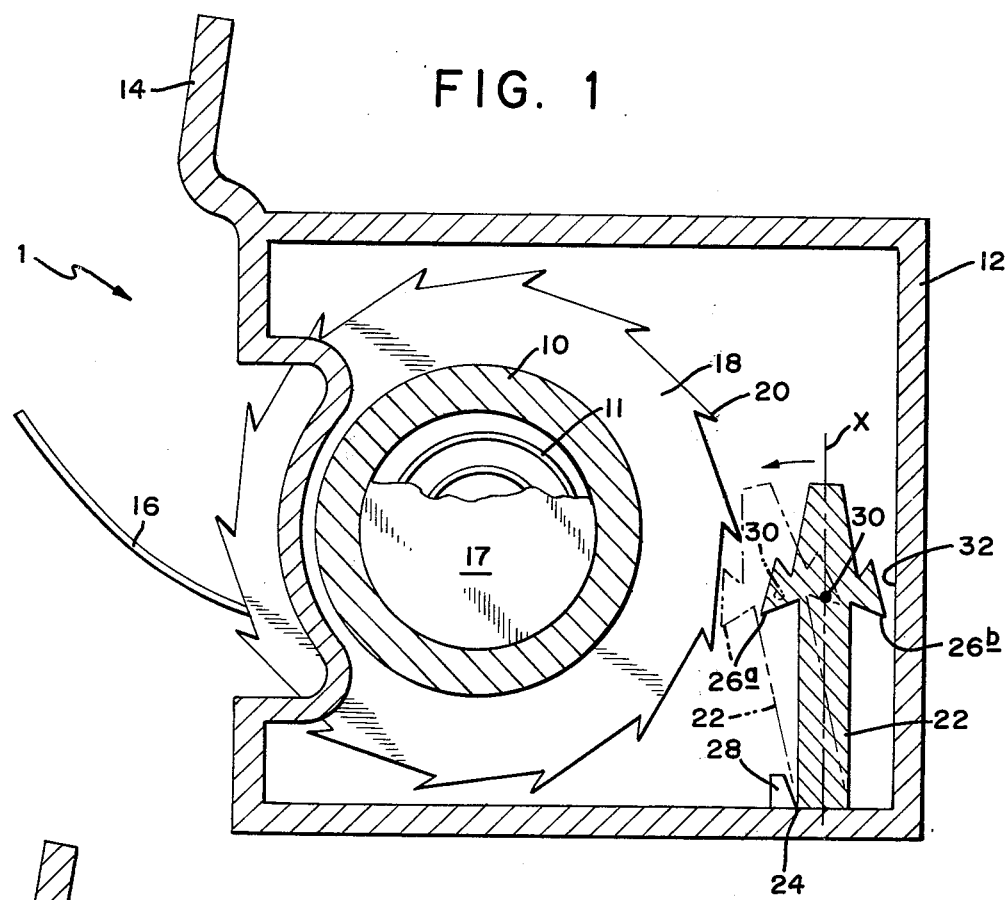

Referring to the drawings, there is illustrated one form of a vehicle sensitive safety belt retractor incorporating the actuating means of the present invention. Other constructions of retractor can also be used. The retractor, shown generally at 1 in FIGS. 1 and 2 of the drawing, should therefore be interpreted as illustrative and not in a limiting sense. As illustrated, the retractor 1 has a reel means 10 connected to a shaft 17 rotatably mounted on a support means 12. The support means 12 is a load bearing member and is provided with a mounting means 14 in the form of a rigid extension adapted to be bolted or otherwise secured to an anchorage point on the vehicle (not shown). A belt means 16, formed for a flexible nylon web or the like, is attached to the reel means 10 for protraction and retraction with respect thereto. The reel means 10 is provided with a biasing means such as a torsion return spring 11 or the like for biasing the reel means 10 in a retraction direction in a conventional manner. Fixedly mounted on the reel means 10 for rotation therewith is a ratchet means 18, the periphery of which has a plurality of circumferential spaced ratched teeth 20 formed by closely spaced notches or slots. As shown in the drawing, the ratchet means 18 may be directly mounted on the reel means 10. However, the definition of "ratchet means" in this specification is intended to include structure, including ratchet teeth, connected to but not directly mounted on the reel means, (for example, said structure utilized for webbing sensitive inertia locking described in U.S. Pat. No. 3,741,496, issued June 26, 1973, which is incorporated herein by reference thereto).

A unitary tippable inertia and locking member 22 is mounted on the support means 12 for engaging the teeth 20 of the ratchet means 18 to stop rotation of the reel means 10, thereby preventing protraction of the belt means 16. The unitary member 22 tips into engagement with the ratchet means 20 as a result of pivoting on its edge 24 against the stop 28. The stop 28 is preferably inclined on its side against which the unitary member bears to allow movement of the member. Each of the reel means 10, support means 12, mounting means 14, ratchet means 18 and unitary member 22 is generally constructed of a suitable material, such as heat treated steel, plastic, or the like.

The unitary member 22 has, in the preferred embodiment, symmetrical extensions 26a and 26b thereon on opposite sides thereof. The locking extension 26a engages the ratchet when the unitary member tips on its pivot point against the stop. The positioning extension 26b keeps the tippable member from tipping in the opposite direction and positions the member between the stop 28 and the sidewall 32 as a result of its engagement with the sidewall 32 of the support 12.

When the tippable member is subjected to acceleration forces, such as to move it so as to tip on the pivot point 26, the acceleration forces must be sufficient to move its center of gravity 30 across the pivot point 26 to retain the tippable member in a locking position. When such forces are present and the unitary member tips into that locking position, the extension 26a engages the teeth 20 of the ratchet to lock the reel. Since the center of inertia has passed over the pivot point, as shown in phantom, the tippable member cannot return to its stable unlocked position until the ratchet moves in the belt retracting direction to push the tippable member, and thus the center of gravity of that member across the pivot point, to its stable, vertical locked position.

The acceleration required for displacement of the unitary member from its substantially vertical, stable, unlocked position to its stable, tipped locked position depends upon the dimensions of the unitary member and its weight. A representative example of the retractor 1 has a unitary member of 1cm. high and 0.33cm. in width with the extensions 26a and 26b extending 0.2cm. from the central axis to provide the locking means. Thus constructed, the retractor is responsive to acceleration in the order of about 0.3 g. in the substantially horizontal plane. Of course, the retractor can be differently constructed so as to respond to acceleration having a different magnitude.

As previously noted, the unitary member is pivoted on a stop 28 on the mounting means, its lower edge 26 contacting a relatively small portion of the stop. The contact thereby created eliminates sliding friction, as well as the entrapment of dirt particles and corroded material.

Accelerations below the preselected magnitude, such as those generated by road noise and the like, have a magnitude insufficient to bring the unitary member's center of gravity past the pivot point, so that the unitary member remains in the substantially vertical position and does not take on its locking functions. Since there is no intermediary structure between the unitary tippable inertia and locking member and the ratchet, the mounting means is less subject to variation in response or to wear than in prior art structure. Accordingly, the retractor has high reliability and low maintenance costs.

Figure 2:
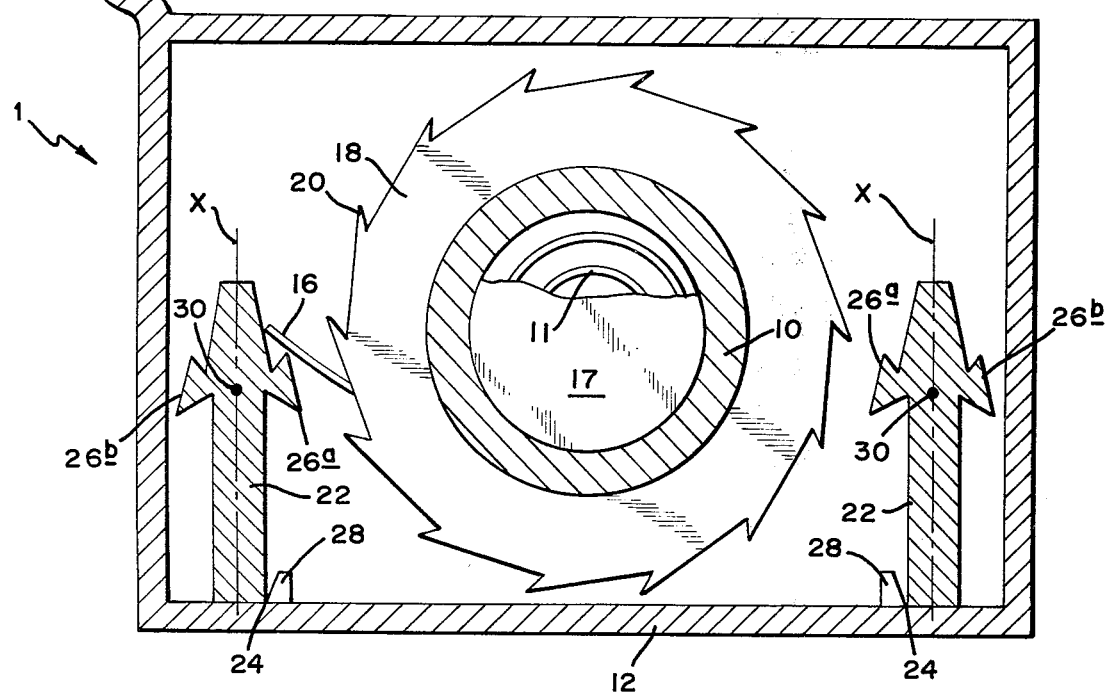
FIG. 2 shows the retractor embodiment with multiple (two) unitary means acting on the ratchet.

As shown in FIG. 2, a multiplicity of unitary members, preferably two, may be utilized with the ratchet to account for acceleration forces from different directions.

The retractor which has been disclosed, can, of course, be modified in numerous ways without department from the scope of the invention. For example, the unitary member can be made adjustable so as to be in a vertical position in a number of different attitudes on the retractor, for ease of mounting in different car bodies. Furthermore, the dimensions of the unitary member may be altered without altering its function.

Having thus described the invention in detail with relation to the details of the embodiments of the drawings, it will be understood that these details need not be strictly adhered to, but that various changes and modifications may suggest themselves to one skilled in the art, all falling within the scope of the invention as defined by the subjoined claims.

We claim:

1. A safety belt retractor, comprising:
   a. a support member;
   b. reel means rotatably mounted on said support means;
   c. belt means attached to said reel means for protraction and retraction with respect thereto;
   d. biasing means for urging said reel means in a retracting direction;

e. ratchet means associated with said reel means for locking it;
f. a unitary tippable inertia and locking member mounted on the support means in a normally stable vertical position;
g. a stop on said support means;
h. said unitary member engaging said stop for pivoting thereagainst to tip from the vertical position for engagement with said ratchet means on the occurrence of acceleration forces sufficient to tip it to lock the reel from protraction of the belt;
i. said unitary member including a locking extension on at least one side thereof for engaging the ratchet; and
j. said unitary member of such shape that its center of gravity passes over the pivot formed by the member and the stop to retain the unitary member in its locking position when the unitary member has tipped from the vertical position to that locking position until retraction of the belt and movement of the ratchet in retracting direction pushes the unitary member to return to its stable vertical unlocked position.

2. A safety belt retractor, comprising:
a. a support member;
b. reel means rotatably mounted on said support means;
c. belt means attached to said reel means for protraction and retraction with respect thereto;
d. biasing means for urging said reel means in a retracting direction;
e. ratchet means associated with said reel means for locking it;
f. a unitary tippable inertia and locking member mounted on the support means in a normally stable vertical position;
g. a stop on said support means;
h. said unitary member engaging said stop for pivoting thereagainst for engagement with said ratchet means on the occurrence of acceleration forces sufficient to tip it to lock the reel from protraction of the belt;
i. said unitary member including a locking extension on at least one side thereof for engaging the ratchet;
j. said unitary member of such shape that its center of gravity passes over the pivot formed by the member and the stop to retain the unitary member in its locking position when the unitary member has tipped to that locking position until retraction of the belt and movement of the ratchet in retracting direction pushes the unitary member to its stable vertical unlocked position and the unitary member having extensions on each side thereof, with the extension on the side opposite the locking extension positioning the unitary member on the support and cooperating with the support to keep the unitary member from tipping in the direction opposite to the locking direction.

3. A safety belt retractor, comprising:
a. a support member;
reel means rotatably mounted on said support means;
c. belt means attached to said reel means for protraction and retraction with respect thereto;
d. biasing means for urging said reel means in a retracting direction;
e. ratchet means associated with said reel means for locking it;
f. a unitary tippable inertia and locking member mounted on the support means in a normally stable vertical position;
g. a stop on said support means;
h. said unitary member engaging said stop for pivoting thereagainst for engagement with said ratchet means on the occurrence of acceleration forces sufficient to tip it to lock the reel from protraction of the belt;
i. said unitary member including a locking extension on at least one side thereof for engaging the ratchet;
j. said unitary member of such shape that its center of gravity passes over the pivot formed by the member and the stop to retain the unitary member in its locking position when the unitary member has tipped to that locking position until retraction of the belt and movement of the ratchet in retracting direction pushes the unitary member to its stable vertical unlocked position; and the stop on said support means being inclined on the side facing the unitary member to provide for limited pivoting movement of said member.

4. A safety belt retractor as recited in claim 1, further including a plurality of said unitary tippable inertia and locking members disposed on said support means for locking said ratchet.

* * * * *